United States Patent
Pangal et al.

(10) Patent No.: US 7,080,111 B2
(45) Date of Patent: Jul. 18, 2006

(54) FLOATING POINT MULTIPLY ACCUMULATOR

(75) Inventors: Amaresh Pangal, Hillsboro, OR (US); Dinesh Somasekhar, Hillsboro, OR (US); Shekhar Y. Borkar, Beaverton, OR (US); Sriram R. Vangal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 09/873,557

(22) Filed: Jun. 4, 2001

(65) Prior Publication Data

US 2002/0194240 A1    Dec. 19, 2002

(51) Int. Cl.
*G06F 7/38* (2006.01)

(52) U.S. Cl. .................................... 708/501

(58) Field of Classification Search ........... 708/523, 708/501, 603, 620, 495
See application file for complete search history.

(56) References Cited

U.S. PATENT DOCUMENTS

| | | | | |
|---|---|---|---|---|
| 5,058,048 | A | * | 10/1991 | Gupta et al. ............. 708/508 |
| 5,185,713 | A | * | 2/1993 | Kobunaya ................. 708/501 |
| 5,764,089 | A | | 6/1998 | Partovi et al. |
| 5,847,981 | A | | 12/1998 | Kelley et al. |
| 5,880,984 | A | * | 3/1999 | Burchfiel et al. .......... 708/501 |
| 5,898,330 | A | | 4/1999 | Klass |
| 5,900,759 | A | | 5/1999 | Tam |
| 5,923,575 | A | * | 7/1999 | Efrat et al. ............... 708/205 |
| 5,978,827 | A | | 11/1999 | Ichikawa |
| 5,993,051 | A | | 11/1999 | Jiang et al. |
| 6,018,756 | A | | 1/2000 | Wolrich et al. |
| 6,175,851 | B1 | | 1/2001 | Iourcha et al. |
| 6,205,462 | B1 | * | 3/2001 | Wyland et al. ............ 708/503 |
| 6,256,655 | B1 | * | 7/2001 | Ezer et al. ................. 708/501 |
| 6,360,189 | B1 | | 3/2002 | Hinds et al. |
| 6,363,476 | B1 | * | 3/2002 | Ide ............................ 708/501 |
| 6,397,239 | B1 | | 5/2002 | Oberman et al. |
| 6,397,240 | B1 | | 5/2002 | Fernando et al. |
| 6,401,194 | B1 | * | 6/2002 | Nguyen et al. ............ 712/210 |
| 6,438,569 | B1 | | 8/2002 | Abbott |
| 6,480,872 | B1 | | 11/2002 | Choquette |
| 6,529,928 | B1 | | 3/2003 | Resnick et al. |

(Continued)

OTHER PUBLICATIONS

Elguibaly, F., "A Fast Parallel Multiplier-Accumulator Using the Modified Booth Algorithm", *IEEE Transactions on Circuits and Systems—II : Analog and Digital Signal Processing*, 47 (9), pp. 902-908, (Sep. 2000).

(Continued)

*Primary Examiner*—Kakali Chaki
*Assistant Examiner*—Chat C. Do
(74) *Attorney, Agent, or Firm*—Schwegman, Lundberg, Woessner & Kluth, P.A.

(57) ABSTRACT

A multiply-accumulate circuit includes a compressor tree to generate a product with a binary exponent and a mantissa in carry-save format. The product is converted into a number having a three bit exponent and a fifty-seven bit mantissa in carry-save format for accumulation. An adder circuit accumulates the converted products in carry-save format. Because the products being summed are in carry-save format, post-normalization is avoided within the adder feedback loop. The adder operates on floating point number representations having exponents with a least significant bit weight of thirty-two, and exponent comparisons within the adder exponent path are limited in size. Variable shifters are avoided in the adder mantissa path. A single mantissa shift of thirty-two bits is provided by a conditional shifter.

26 Claims, 10 Drawing Sheets

U.S. PATENT DOCUMENTS

| | | | |
|---|---|---|---|
| 6,542,915 B1 * | 4/2003 | Dibrino et al. | 708/501 |
| 6,571,266 B1 * | 5/2003 | Bass | 708/501 |
| 6,571,267 B1 | 5/2003 | Yoshioka | |
| 6,578,060 B1 | 6/2003 | Chen et al. | |
| 6,578,063 B1 | 6/2003 | Kojima et al. | |
| 6,584,485 B1 | 6/2003 | Aoki et al. | |
| 6,779,013 B1 * | 8/2004 | Pangal | 708/503 |
| 2003/0018676 A1 * | 1/2003 | Shaw | |
| 2003/0028572 A1 * | 2/2003 | Hoskote et al. | |
| 2004/0225703 A1 | 11/2004 | Pangal | |

OTHER PUBLICATIONS

Hokenek, E., et al., "Second-Generation RISC Floating Point with Multiply—Add Fused", *IEEE Journal of Solid-State Circuits*, 25 (5), pp. 1207-1213, (1990).

Luo, Z., et al., "Accelerating Pipelined Integar and Floating-Point Accumulations in Configurable Hardware with Delayed Addition Techniques", *IEEE Transactions on Computers*, 49 (3), 208-218, (Mar. 2000).

Panneerselvam, G., et al., "Multiply-Add Fused RISC Architectures for DSP Applications", *IEEE Pac Rim*, pp. 108-111, (1993).

Beaumont-Smith, A., et al., "Reduced Latency IEEE Floating-Point Standard Adder Architectures", *Proceedings of the 14th IEEE Symposium on Computer Arithmetic*, 8 pgs., (1998).

Even, G., et al., "On the Design of IEEE Compliant Floating Point Units", *IEEE Transactions on Computers*, vol. 49, 398-413, (May 2000).

Goto, G., et al., "A 54×54-b Regularly Structured Tree Multiplier", *IEEE Journal of Solid-State Circuits*, vol. 27, 1229-1236, (Sep. 1992).

Ide, N., et al., "2.44-GFLOPS 300-MHz Floating-Point Vector-Processing Unit for High-Performance 3-D Graphics Computing", *IEEE Journal of Solid-State Circuits*, vol. 35, 1025-1033, (Jul. 2000).

Klass, F., "Semi-Dynamic and Dynamic Flip-Flops with Embedded Logic", *Proceedings of the Symposium on VLSI Circuits, Digest of Technical Papers*, Honolulu, HI, IEEE Circuits Soc. Japan Soc. Appl. Phys. Inst. Electron., Inf. & Commun. Eng. Japan, pp. 108-109, (1998).

Lee, K.T., et al., "1 GHz Leading Zero Anticipator Using Independent Sign-Bit Determination Logic", *2000 Symposium on VLSI Circuits Digest of Technical Papers*, 194-195, (2000).

Partovi, H., et al., "Flow-Through Latch and Edge-Triggered Flip-Flop Hybrid Elements", *Proceedings of the IEEE International Solid-State Circuits Conference, Digest of Technical Papers and Slide Supplement*, NexGen Inc., Milpitas, CA, 40 pgs., (1996).

Debabrata, G., et al., "Architectural Synthesis of Performance-Driven Multipliers with Accumulator Interleaving", *ACM/IEEE Design Automation Conference*, (1993),303-307.

\* cited by examiner

FLOATING POINT MULTIPLY ACCUMULATOR

FIELD

The present invention relates generally to floating point operations, and more specifically to floating point multiply accumulators.

BACKGROUND

Fast floating point mathematical operations have become an important feature in modernm electronics. Floating point units are useful in applications such as three-dimensional graphics computations and digital signal processing (DSP). Examples of three-dimensional graphics computation include geometry transformations and perspective transformations. These transformations are performed when the motion of objects is determined by calculating physical equations in response to interactive events instead of replaying prerecorded data.

Many DSP operations, such as finite impulse response (FIR) filters, compute $\Sigma(a_i b_i)$, where i=0 to n--1, and $a_i$ and $b_i$ are both single precision floating point numbers. This type of computation typically employs floating point multiply accumulate (FMAC) units which perform many multiplication operations and add the resulting products to give the final result. In these types of applications, fast FMAC units typically execute multiplies and additions in parallel without pipeline bubbles. One example FMAC unit is described in: Nobuhiro et al., "2.44-GFLOPS 300-MHz Floating-Point Vector Processing Unit for High-Performance 3-D Graphics Computing," IEEE Journal of Solid State Circuits, Vol. 35, No. 7, July 2000.

The Institute of Electrical and Electronic Engineers (IEEE) has published an industry standard for floating point operations in the ANSI/IEEE Std 754-1985, *IEEE Standard for Binary Floating-Point Arithmetic*, IEEE, New York, 1985, hereinafter referred to as the "IEEE standard." A typical implementation for a floating point FMAC compliant with the IEEE standard is shown in FIG. 1. FMAC 100 implements a single precision floating point multiply and accumulate instruction "D=(A×B)+C," as an indivisible operation. As can be seen from FIG. 1, fast floating point multipliers and fast floating point adders are both important ingredients to make a fast FMAC.

Multiplicands A and B are received by multiplier 110, and the product is normalized in post-normalization block 120. Multiplicands A and B are typically in an IEEE standard floating point format, and post-normalization block 120 typically operates on (normalizes) the output of multiplier 110 to make the product conform to the same format. For example, when multiplicands A and B are IEEE standard single precision floating point numbers, post-normalization block 120 operates on the output from multiplier 110 so that adder 130 receives the product as an IEEE standard single precision floating point number.

Adder 130 adds the normalized product from post-normalization block 120 with the output from multiplexer 140. Multiplexer 140 can choose between the number C and the previous sum on node 152. When the previous sum is used, FMAC 100 is performing a multiply-accumulate function. The output of adder 130 is normalized in post-normalization block 150 so that the sum on node 152 is in the standard format discussed above.

Adder 130 and post-normalization block 150 can be "non-pipelined," which means that an accumulation can be performed in a single clock cycle. When non-pipelined, adder 130 and post-normalization block typically include sufficient logic to limit the frequency at which FMAC 100 can operate, in part because floating point adders typically include circuits for alignment, mantissa addition, rounding, and other complex operations. To increase the frequency of operation, adder 130 and post-normalization block 150 can be "pipelined," which means registers can be included in the data path to store intermediate results. One disadvantage of pipelining is the introduction of pipeline stalls or bubbles, which decrease the effective data rate through FMAC 100.

For the reasons stated above, and for other reasons stated below which will become apparent to those skilled in the art upon reading and understanding the present specification, there is a need in the art for fast floating point multiply and accumulate circuits.

DESCRIPTION OF EMBODIMENTS

Figure 1:
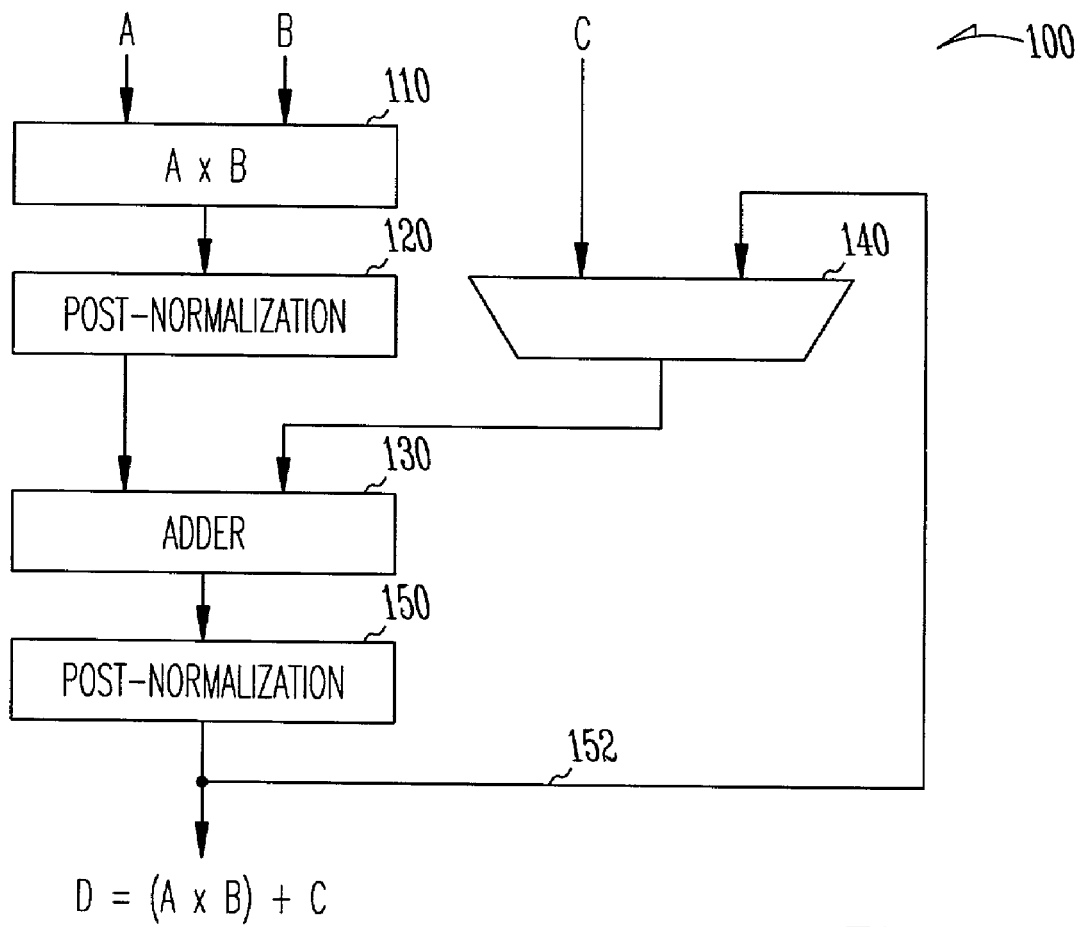
FIG. 1 shows a prior art floating point multiply-accumulate circuit.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Floating Ppoint Ultiply Accumulator

Figure 2:
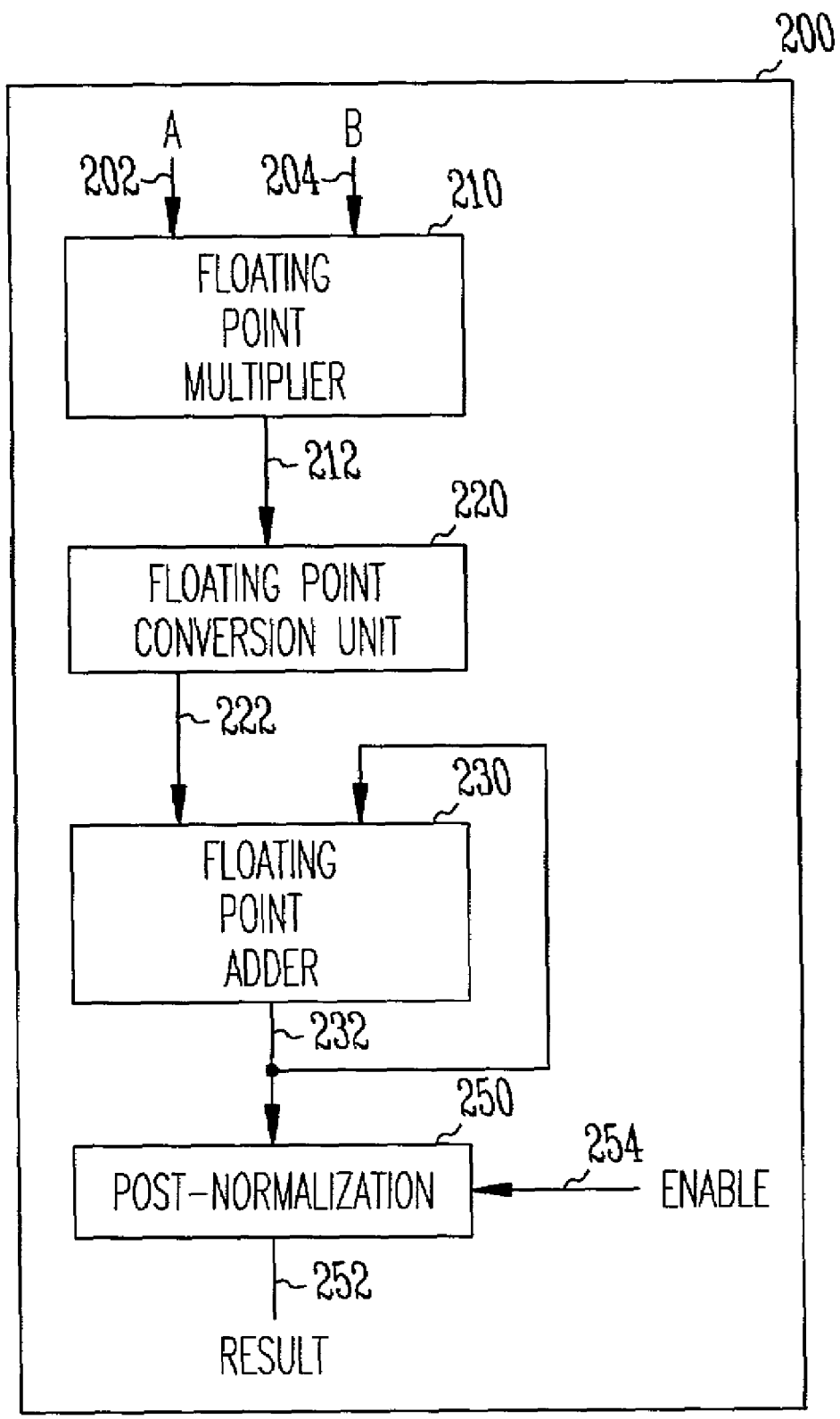
FIG. 2 shows an integrated circuit with a floating point multiply-accumulate circuit.

FIG. 2 shows an integrated circuit with a floating point multiply-accumulate circuit. Integrated circuit 200 includes floating point multiplier 210, floating point conversion unit 220, floating point adder 230, and post-normalization circuit 250. Each of the elements shown in FIG. 2 is explained in further detail with reference to figures that follow. In this section, a brief overview of the FIG. 2 elements and their operation is given to provide a context for more detailed explanations that follow.

Each node in FIG. 2 is shown as a single line for clarity. Most of these nodes include many physical connections, or "traces," within integrated circuit 200. For example, floating point numbers generally include sign bits, exponent fields, and mantissa fields. Therefore, nodes that hold floating point numbers, such as nodes 202 and 204, include many physical connections within integrated circuit 200. This convention is used throughout this description, and nodes shown as single lines are not necessarily intended to represent a single physical connection.

Floating point multiplier 210 receives two floating point operands, operand A on node 202, and operand B on node 204, and produces a floating point product on node 212. The floating point product on node 212 is converted to a different floating point representation by floating point conversion unit 220. Node 222 holds the converted product generated by floating point conversion unit 220. This is in contrast to the prior art implementation shown in FIG. 1. In the implementation of FIG. 1, as described above, the output of the multiplier is post-normalized to represent the product in the same format as the operands. In the embodiment of FIG. 2, in contrast, the output of floating point multiplier 210 is not post-normalized. Instead, it is converted to a different floating point format.

Floating point adder 230 receives the converted product on node 222, and also receives a previous sum on node 232. Floating point adder then produces a present sum on node 232. It should be noted that the output of floating point adder 230 is not post-normalized prior to being fed back for accumulation. The lack of a post-normalization circuit in the feedback path provides for a faster FMAC. Post-normalization circuit 250 receives the sum on node 232 and produces a result on node 252. Again, it should be noted that the post-normalization operation is reserved for the end of the multiply-accumulate circuit rather than immediately after both the multiplier and the adder.

In the embodiments represented by FIG. 2, post-normalization circuit 250 receives an enable signal on node 254. The enable signal allows the post-normalization circuitry to be turned off while the majority of the multiplications and accumulations are performed, and then turned on at the end of the operation when the result is generated. In this manner, post-normalization circuit 250 can be turned off for a majority of the time, thereby saving power.

Integrated circuit 200 can be any type of integrated circuit capable of including a multiply accumulate circuit. For example, integrated circuit 200 can be a processor such as a microprocessor, a digital signal processor, a micro controller, or the like. Integrated circuit 200 can also be an integrated circuit other than a processor such as an application-specific integrated circuit (ASIC), a communications device or a memory controller.

In general, floating-point numbers are represented as a concatenation of a sign bit, an exponent field, and a significant field (also referred to as the mantissa). In the IEEE single precision floating-point format, the most significant bit (integer bit) of the mantissa is not represented. The most significant bit of the mantissa has an assumed value of 1, except for denormal numbers, whose most significant bit of the mantissa is 0. A single precision floating point number as specified by the IEEE standard has a 23 bit mantissa field, an eight bit exponent field, and a one bit sign field. The remainder of this description is arranged to describe multiply-accumulate operations on IEEE single precision floating point numbers, but this is not a limitation of the invention. IEEE compliant numbers have been chosen for illustration of the present invention because of their wide-spread use, but one skilled in the art will understand that any other floating point format can be utilized without departing from the scope of the invention.

Figure 3:
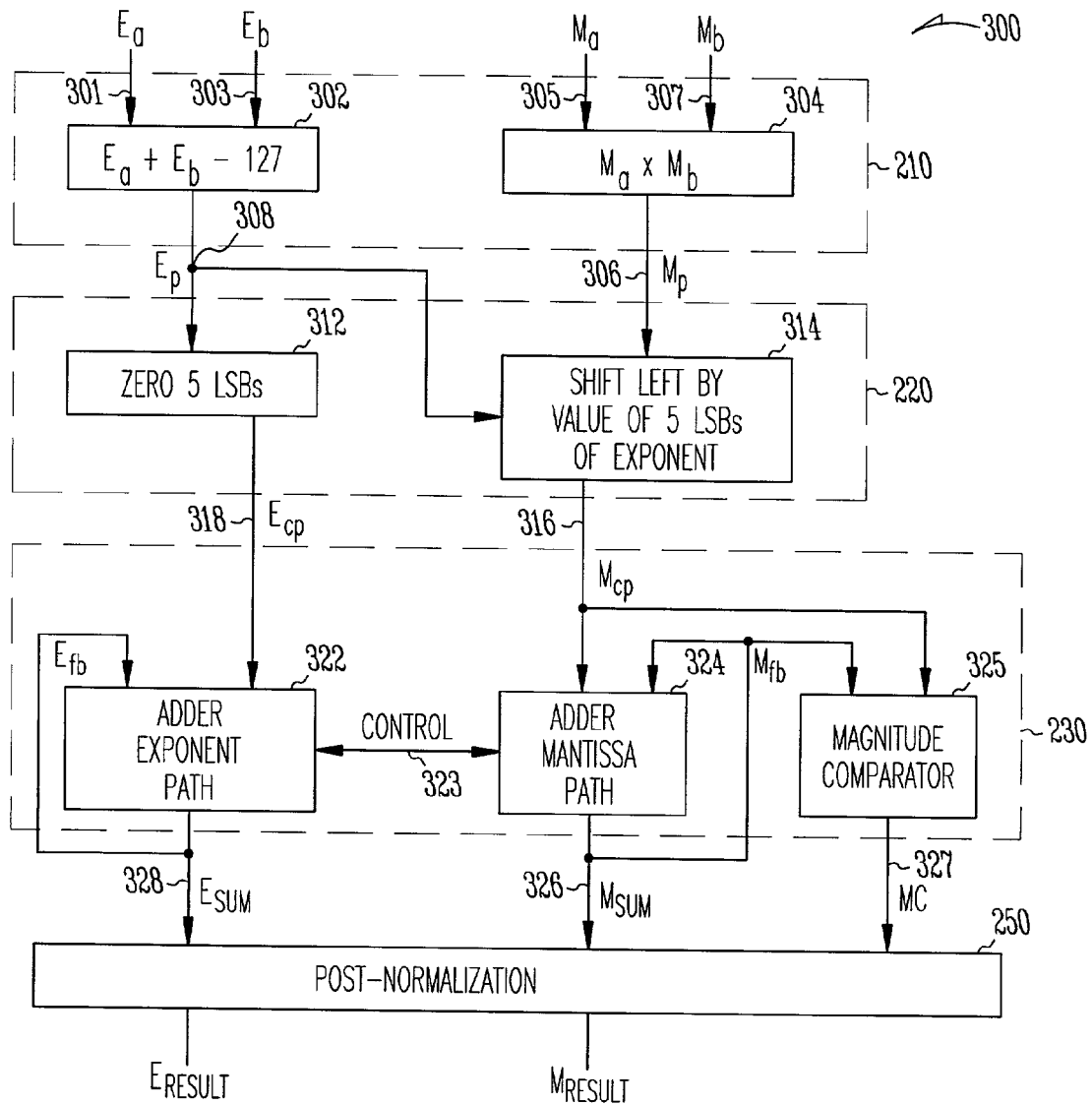
FIG. 3 shows the exponent and mantissa paths of a floating point multiply-accumulate circuit.

FIG. 3 shows the exponent and mantissa paths of a floating point multiply-accumulate circuit. The various elements of FIG. 2 are shown again in FIG. 3, but with slightly more detail. In particular, each element, where appropriate, is shown broken down into an exponent path and a mantissa path. Operations involving the sign bits of the floating point numbers are not shown in FIG. 3. Instead, all operations involving sign bits are presented in detail in later figures. For all floating point numbers referred to in this description, all sign bits, exponent fields, and mantissa fields are labeled with a capital S, E, and M, respectively, with an identifying subscript. For example, floating point number A includes sign bit $S_a$, exponent field $E_a$, and mantissa field $M_a$, and floating point number B includes sign bit $S_b$, exponent field $E_b$, and mantissa field $M_b$.

Floating point multiplier 210 includes exponent path 302 and mantissa path 304. Floating point multiplier 210 also includes an exclusive-or gate (not shown) to generate the sign of the product, $S_p$, from the signs of the operands, $S_a$ and $S_b$, as is well known in the art. Exponent path 302 includes an exponent summer that receives exponents $E_a$ and $E_b$ on nodes 301 and 303 respectively, and sums them with negative 127 to produce the exponent of the product, $E_p$, on node 308. $E_a$ and $E_b$ are each eight bit numbers, as is $E_p$. Negative 127 is summed with the exponent fields because the IEEE single precision floating point format utilizes biased exponents. Exponent path 302 can be implemented using standard adder architectures as are well known in the art.

Mantissa path 304 receives mantissas $M_a$ and $M_b$ on nodes 305 and 307, respectively. Mantissa path 304 includes a mantissa multiplier that multiplies mantissas $M_a$ and $M_b$, and produces the mantissa of the product, $M_p$, on node 306. Mantissas $M_a$ and $M_b$ are each 23 bits in accordance with the IEEE standard, and mantissa $M_p$ is 24 bits in carry-save format. Mantissa path 304 and carry-save format are described in more detail with reference to FIG. 4 below.

The exponent of the product, $E_p$, is an eight bit number with a least significant bit weight equal to one. For example, an $E_p$ field of 00000011 has a value of three, because the least significant bit has a weight of one, and the next more significant bit has a weight of two. For the purposes of this description, this exponent format is termed "base 2," and the product is said to be in base 2. Floating point conversion unit 220 converts the product from base 2 to a different base. For example, exponent path 312 is an exponent conversion unit that sets the least significant five bits of the exponent field to zero, and truncates the exponent field to three bits, leaving the least significant bit of the exponent of the converted product, $E_{cp}$, with a weight of 32. For example, an $E_{cp}$ field of 011 has a value of 96, because the least significant bit has a weight of 32, and the next more significant bit has a weight of 64. For the purposes of this description, this exponent format is termed "base 32," and the converted product is said to be in base 32.

Mantissa path 314 of floating point conversion unit 220 shifts the mantissa of the product, $M_p$, to the left by the number of bit positions equal to the value of the least significant five bits of the exponent of the product, $E_p$. Mantissa path 314 presents a 57 bit mantissa in carry-save format on node 316. Floating point conversion unit 220 does not operate on the sign bit, so the sign of the converted product, $S_{cp}$, is the same as the sign of the product, $S_p$. One embodiment of floating point conversion unit 220 is shown in more detail in FIG. 5.

Floating point adder 230 includes adder exponent path 322, adder mantissa path 324, and magnitude comparator 325. Exponent path 322 includes an exponent accumulation stage that receives the converted product exponent, $E_{cp}$, on node 318, and the feedback exponent, $E_{fb}$, on node 328, and produces the sum exponent $E_{sum}$ on node 328. The sum is a base 32 number in carry-save format. Exponent path 322 also produces control signals on node 323. Node 323 carries information from exponent path 322 to mantissa path 324 to signify whether the two exponents are equal ($E_{cp}=E_{fb}$), whether one exponent is greater than the other ($E_{cp}>E_{fb}$, $E_{cp}<E_{fb}$), and whether one exponent is one greater than the other ($E_{cp}=E_{fb}+1$, $E_{fb}=E_{cp}+1$). Because the converted product and the sum are floating point numbers in base 32 format, an exponent that differs by a least significant bit differs by a "weight" of thirty-two. Exponent path 322 also receives an overflow signal from mantissa path 324 on node 323.

Mantissa path 324 includes a mantissa accumulator that receives mantissa fields $M_{cp}$ and $M_{fb}$ on nodes 316 and 326, respectively, and produces mantissa field $M_{sum}$ on node 326. Mantissa path 324 also receives control signals on node 323 from exponent path 322, and produces the overflow signal and sends it to exponent path 322. Embodiments of adder exponent path 322 and adder mantissa path 324 and the signals therebetween are described in more detail with reference to FIGS. 8 and 9, below. Magnitude comparator 325 receives mantissa fields $M_{cp}$ and $M_{fb}$ on nodes 316 and 326, respectively, and produces a magnitude compare (MC) result on node 327. MC is used by post-normalization circuit 250 to aid in the determination of the sign of the result, as is further explained below with reference to FIGS. 11 and 12.

Post-normalization circuit 250 receives the base 32 carry-save format sum from floating point adder 230, and converts it to an IEEE single precision floating point number. One embodiment of post-normalization circuit 250 is described in more detail with reference to FIG. 11, below.

Multiplier

Figure 4:
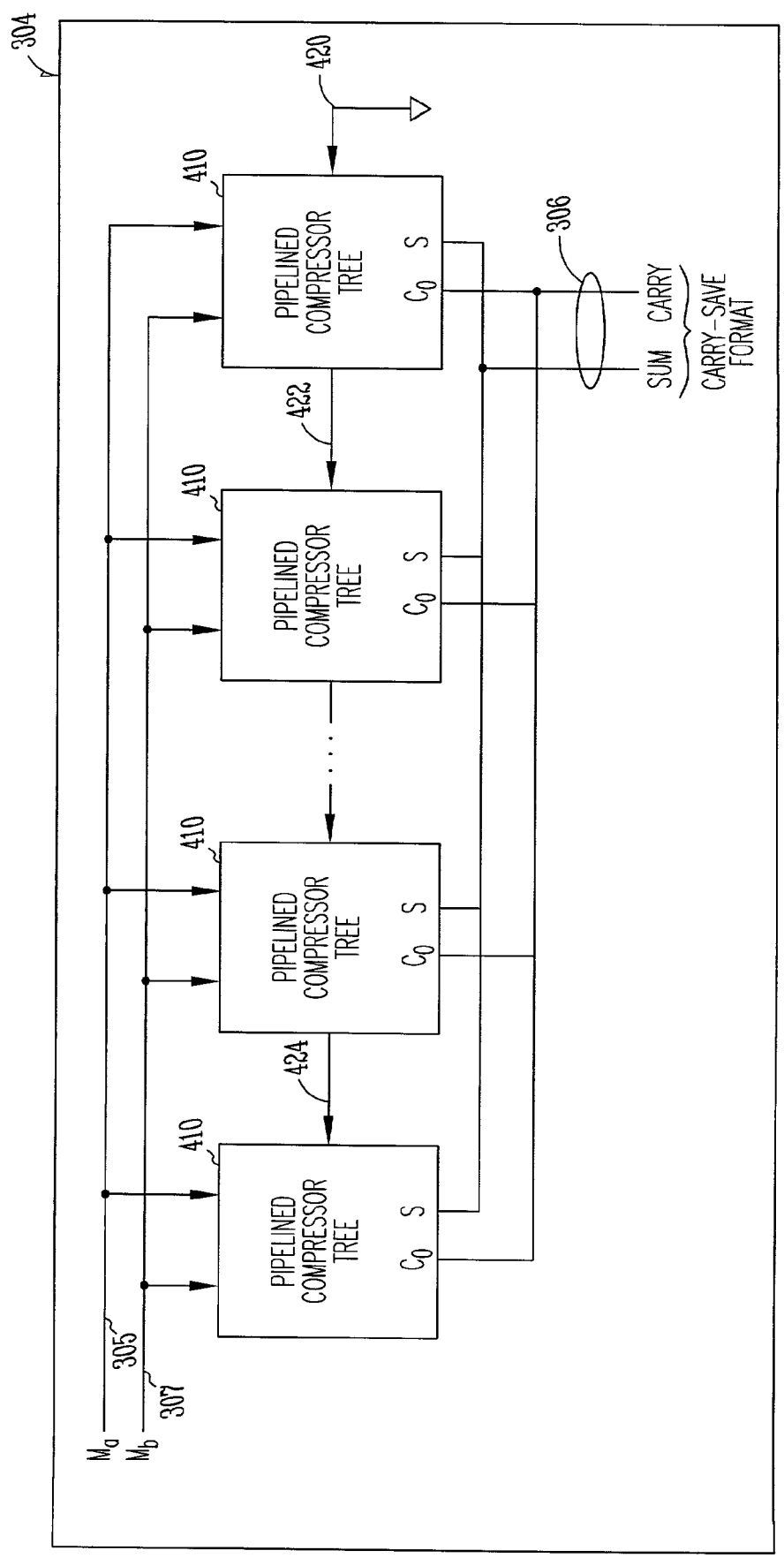
FIG. 4 shows a mantissa multiplier circuit.

As previously described, multiplier 210 includes an exclusive-or function for sign bit generation, an exponent path for generating the exponent of the product, and a mantissa path to generate a mantissa of the product in carry-save format. FIG. 4 shows an embodiment of multiplier mantissa path 304. Mantissa path 304 includes a plurality of compressor trees 410. Each of compressor trees 410 receives a part of mantissa $M_a$ on node 305 and a part of a mantissa $M_b$ on node 307, and produces carry and sum signals to form mantissa $M_p$ on node 306 in carry-save format. Carry-save format is a redundant format wherein each bit within the number is represented by two physical bits, a sum bit and a carry bit. Therefore, a 24 bit number in carry-save format is represented by 48 physical bits: 24 bits of sum, and 24 bits of carry. Each of compressor trees 410 generates a single sum bit and a single carry bit. Embodiments that produce a 24 bit carry-save number include 24 compressor trees 410.

Prior art multipliers that utilize compressor trees typically include a carry propagate adder (CPA) after the compressors to convert the carry-save format product into a binary product. See, for example, G. Goto, T. Sato, M. Nakajima, & T. Sukemura, "A 54×54 Regularly Structured Tree Multiplier," IEEE Journal of Solid State Circuits, p. 1229, Vol. 27, No. 9, September, 1992. The various embodiments of the method and apparatus of the present invention do not include a CPA after the compressors, but instead utilize the product directly in carry-save format.

Each compressor tree 410 receives carry signals from a previous stage, and produces carry signals for the next stage. For example, the least significant compressor tree receives zeros on node 420 as carry in signals, and produces carry signals on node 422 for the next significant stage. The most significant compressor tree receives carry signals from the previous stage on node 424.

Each compressor tree 410 includes a plurality of 3-2 compressors and/or 4-2 compressors arranged to sum partial products generated by partial product generators. For a discussion of compressors, see Neil H. E. Weste & Kamran Eshragihan, "Principles of CMOS VLSI Design: A Systems Perspective," $2^{nd}$ Ed., pp. 554–558 (Addison Wesley Publishing 1994).

Floating Point Conversion Unit

Figure 5:
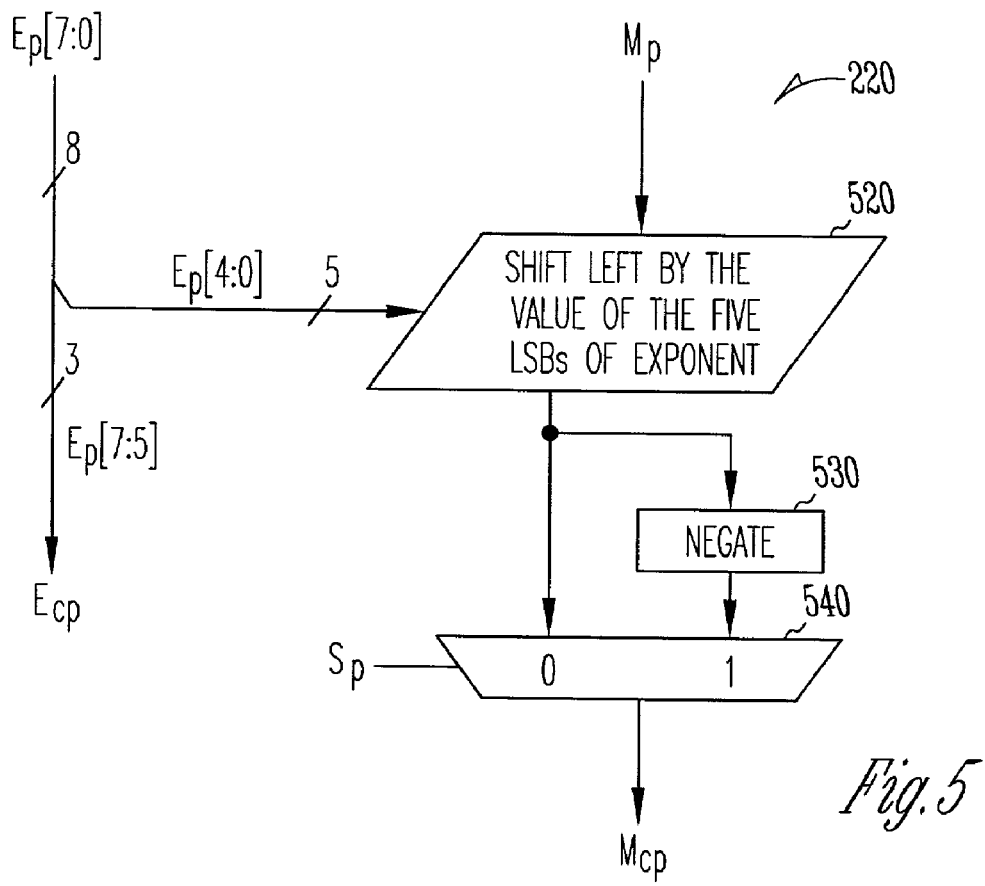
FIG. 5 shows a floating point conversion unit.

FIG. 5 shows a floating point conversion unit. Floating point conversion unit 220 receives eight bit exponent field of the product, $E_p[7:0]$, where $E_p[7]$ is the most significant bit, and $E_p[0]$ is the least significant bit. The exponent of the converted product, $E_{cp}$, is created by removing the least significant five bits from the exponent field. $E_{cp}$ has a least significant bit equal to $E_p[5]$, which has a weight of thirty-two.

Shifter 520 receives the 24 bit product mantissa, $M_p$, in carry-save format, and shifts both the sum field and the carry field left by an amount equal to the value of the least significant five bits of the product exponent, $E_p[4:0]$. If the product is negative, multiplexer 540 selects a negated mantissa that is negated by negation circuit 530. $M_{cp}$ is a 57 bit number in carry-save format, and $E_{cp}$ is a three bit exponent.

Figure 6:
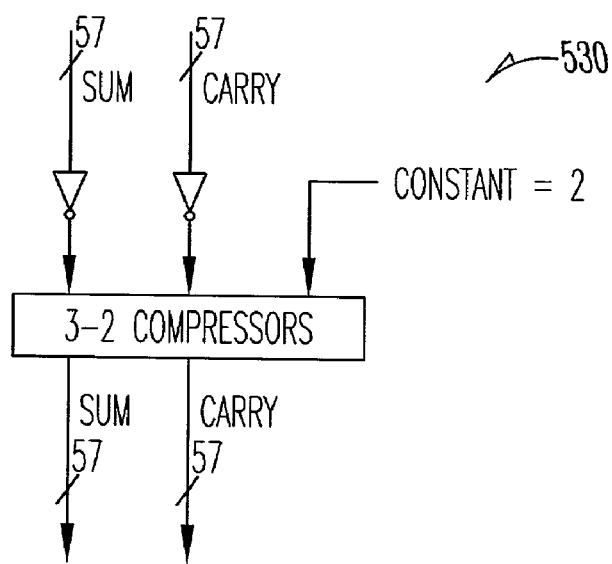
FIG. 6 shows a carry-save negation circuit.

FIG. 6 shows a carry-save negation circuit. Carry-save negation circuit 530 negates a number in carry-save format. Both the sum and carry signals are inverted, and combined with a constant of two using a three-to-two compressor. Carry-save negation circuit 530 negates a 57 bit carry-save number. An example using a six bit carry-save number is now presented to demonstrate the operation of three-to-two compressors to negate a carry-save number. A six bit carry-save number with a value of six is represented as follows:

| | |
|---|---|
| 000010 | <- sum |
| 000100 | <- carry |

When both the sum and carry bits above are summed, the result is 000110, which equals six. The carry-save negation circuit inverts the sum and carry signals and adds two as follows:

| | |
|---|---|
| 111101 | <- inverted sum |
| 111011 | <- inverted carry |
| 000010 | <- constant of two |
| 000100 | <- resulting sum |
| 111011 | <- resulting carry |

Figure 7:
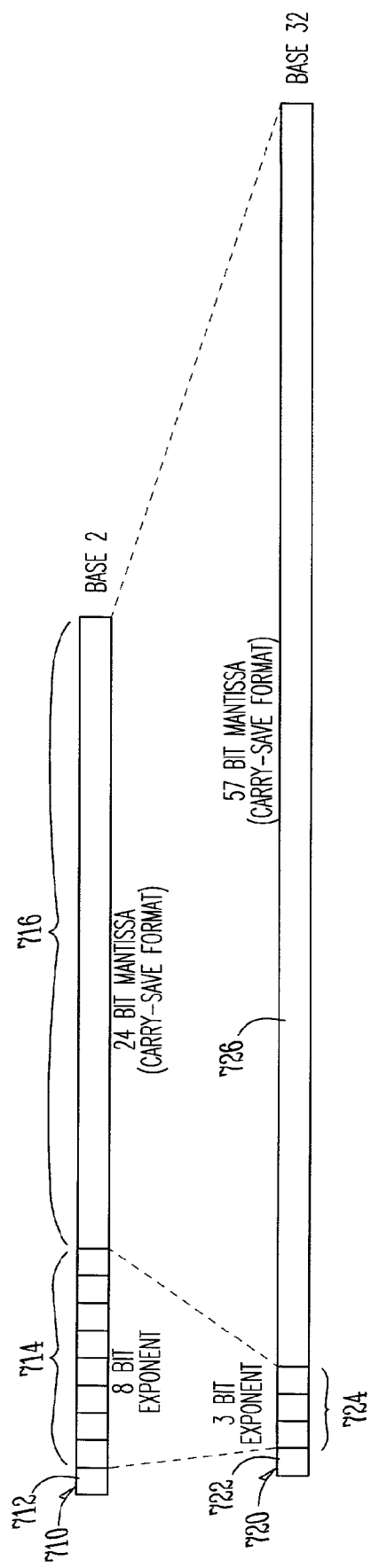
FIG. 7 shows a base 32 floating point number representation.

FIG. 7 shows base 2 and base 32 floating point number representations. Base 2 floating point number representation 710 is the representation produced by floating point multiplier 210 (FIGS. 2 and 3), and base 32 floating point number representation 720 is the representation produced by floating point conversion unit 220 (FIGS. 2 and 3). Base 2 floating point number representation 710 includes sign bit 712, eight bit exponent field 714, and twenty-four bit mantissa field 716. Base 2 floating point number representation 710 is in the IEEE standard single precision format with an explicit integer bit added to increase the mantissa from twenty-three bits to twenty-four bits. Base 32 floating point number 720 includes a sign bit 722, a three bit exponent field 724, and a fifty-seven bit mantissa field 726. Floating point conversion unit 220 (FIG. 6) converts floating point numbers in representation 710 to floating point numbers in representation 720.

Exponent 724 is equal to the most significant three bits of exponent 714. The least significant bit of exponent 724 has a "weight" of thirty-two. In other words, a least significant change in exponent 724 corresponds to a mantissa shift of thirty-two bits. For this reason, floating point representation 720 is referred to as a "base 32" floating point representation.

Floating Point Adder

Figure 8:
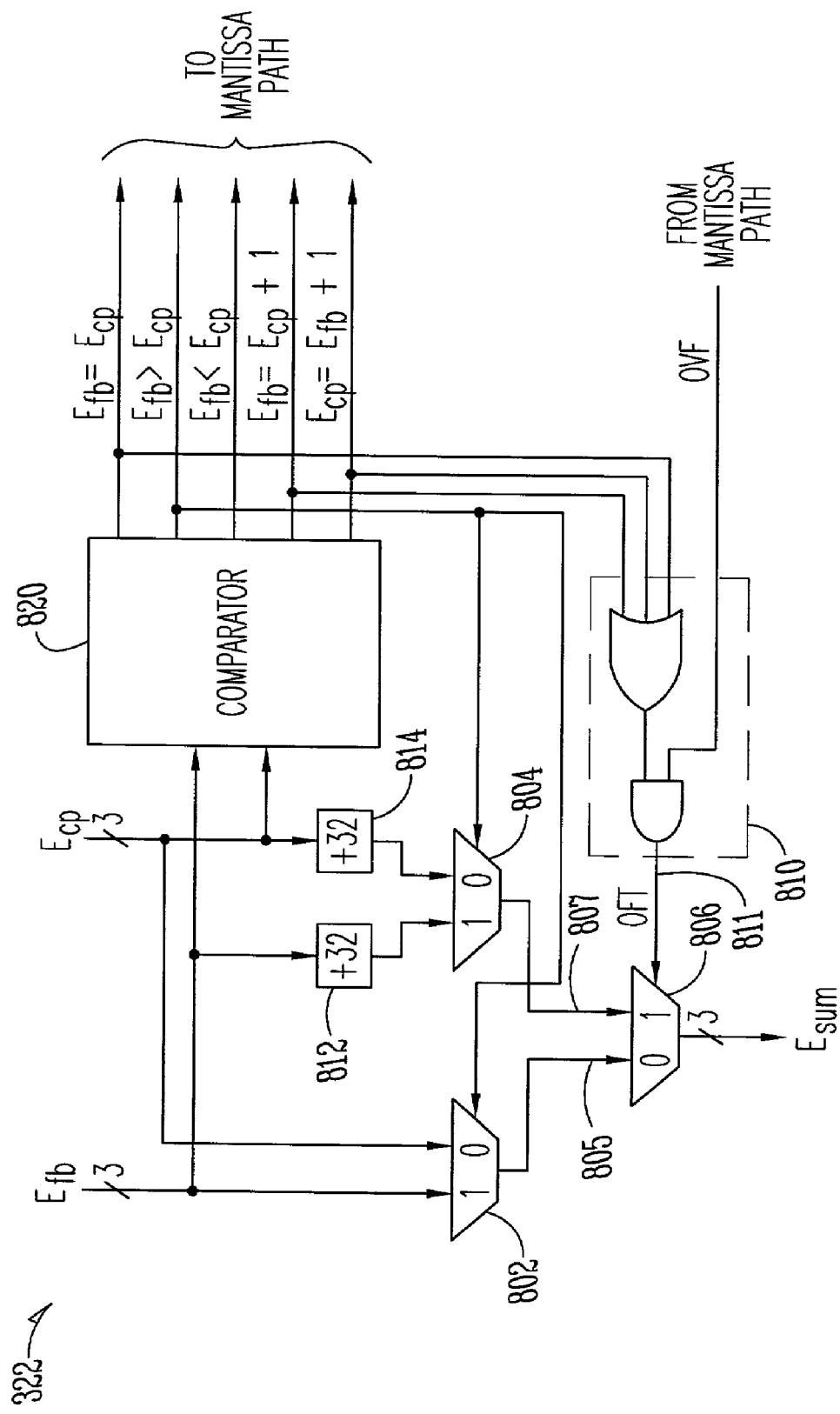
FIG. 8 shows an exponent path of a floating point adder.

FIG. 8 shows an exponent path of a floating point adder. Exponent path 322 includes multiplexors 802, 804, and 806, comparator 820, incrementers 812 and 814, and logic 810. Incrementers 812 and 814 pre-increment $E_{fb}$ and $E_{cp}$ to produce an incremented $E_{fb}$ and an incremented $E_{cp}$, respectively. When either exponent $E_{fb}$ or $E_{cp}$ is incremented, the value of the exponent is changed by thirty-two with respect to the mantissa. Accordingly, incrementers 812 and 814 are shown in FIG. 5 with the label "+32."

In operation, comparator 820 compares exponents $E_{fb}$ and $E_{cp}$, and generates logic outputs as shown in FIG. 8. When $E_{fb}$ is greater than $E_{cp}$, the ($E_{fb}>E_{cp}$) signal controls multiplexors 802 and 804 to select $E_{fb}$ and the incremented $E_{fb}$, respectively. Otherwise, multiplexors 802 and 804 select $E_{cp}$ and the incremented $E_{cp}$, respectively. Multiplexor 806 selects either the exponent on node 805 or the incremented exponent on node 807 based on the overflow trigger (OFT) signal on node 811. OFT is asserted only if the OVF signal is asserted and the two three-bit input exponents are either equal or differ by one. A difference of one between the exponents is equal to a difference of thirty-two in a base 2 representation. Logic 810 receives OVF from the mantissa path and logic outputs from comparator 820, and produces the OFT signal according to the following equation:

$OFT=OVF$ AND $(($E_{fb}=E_{cp}$) OR ($E_{fb}=E_{cp}+1$) OR ($E_{cp}=E_{fb}+1$))$.

When OFT is true, the exponent of the sum, $E_{sum}$, is chosen as the incremented exponent on node 807, and when OFT is false, $E_{sum}$ is chosen as the greater exponent on node 805.

Comparator 820 compares three bit exponents and produces a plurality of outputs that are logic functions of the inputs. Each logic output is a function six input bits: three bits from $E_{fb}$, and three bits from $E_{cp}$. This provides a very quick logic path. In addition to the quick comparison made in the exponent path, the mantissa path includes constant shifters that conditionally shift mantissas by a fixed amount. The combination of a quick exponent comparison in the exponent path and a quick shift in the mantissa path provide for a fast floating point adder circuit. The constant shifter is described in more detail below with reference to FIG. 9.

Figure 9:
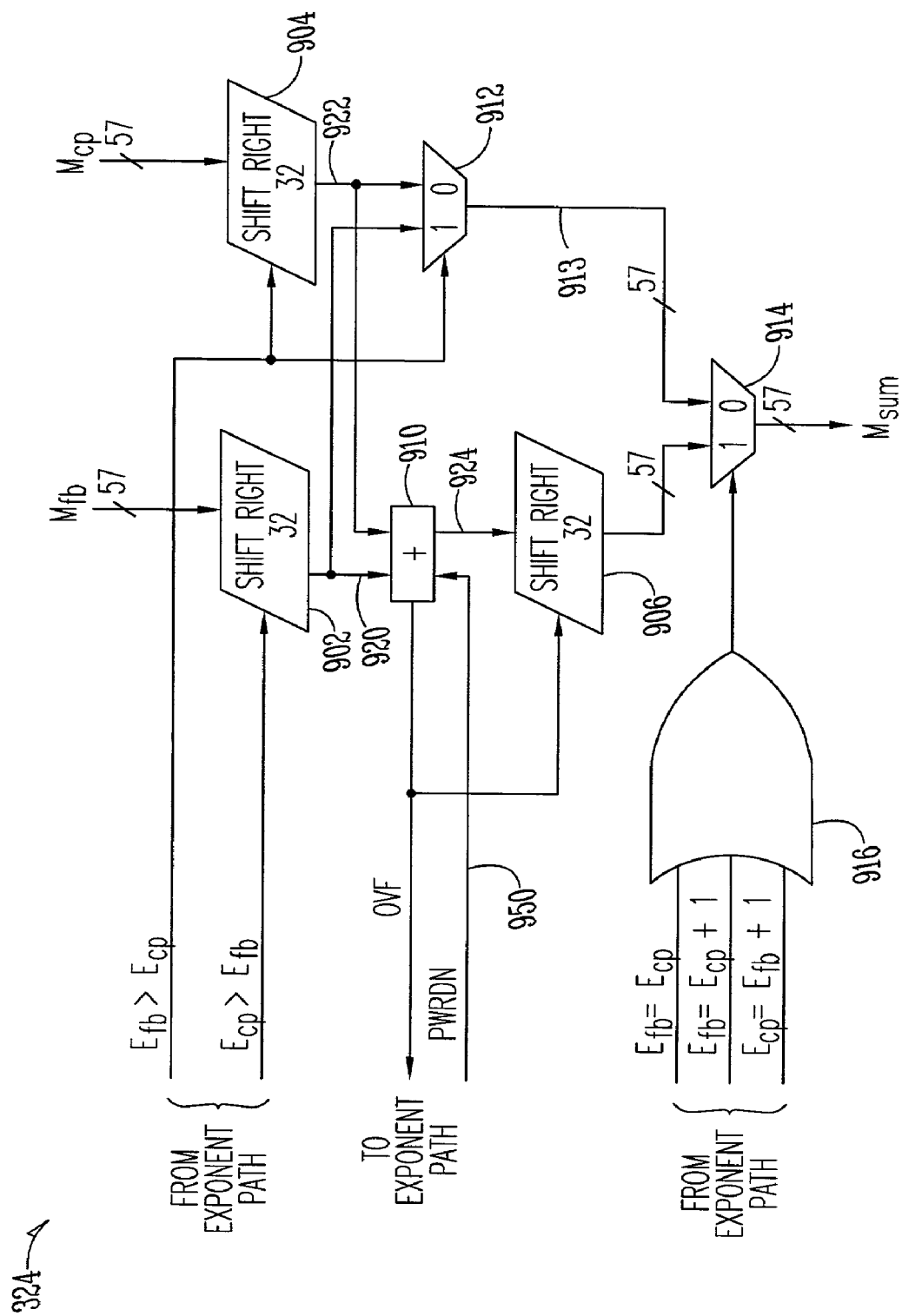
FIG. 9 shows a mantissa path of a floating point adder.

FIG. 9 shows a mantissa path of a floating point adder. Mantissa path 324 includes constant shifters 902, 904, and 906, adder circuit 910, multiplexors 912 and 914, and logic 916. Constant shifters 902, 904, and 906 can be used in place of variable shifters because a change in the least significant bit of the exponent is equal to a shift of thirty-two. This simplification saves on the amount of hardware necessary to implement the adder, and also decreases execution time. In some embodiments, constant shifters 902, 904, and 906 are implemented as a series of two-input multiplexors.

Mantissa path 324 receives mantissa $M_{fb}$ and mantissa $M_{cp}$. In operation, constant shifter 904 shifts $M_{cp}$ thirty-two bit positions to the right when $E_{fb}$ is greater than $E_{cp}$, and constant shifter 902 shifts $M_{fb}$ thirty-two bit positions to the right when $E_{Cp}$ is greater than $E_{fb}$. When $E_{fb}$ is equal to $E_{cp}$, then neither mantissa is shifted in mantissa path 324. After constant shifters 902 and 904, mantissa path 324 separates into two subpaths: the adder path and the bypass path. The adder path includes adder 910 and constant shifter 906, while the bypass path includes multiplexor 912.

Adder circuit 910 compresses the two mantissas in carry-save format on nodes 920 and 922 and produces the result in carry-save format on node 924. In some embodiments, adder circuit 910 includes four-to-two compressors to compress the two input mantissas into the result on node 924. If an overflow occurs in adder circuit 910, the OVF signal is asserted and constant shifter 906 shifts the mantissa produced by adder circuit 910 thirty-two bit positions to the right. The OVF signal is sent to exponent path 322 to conditionally select an incremented exponent, as described above with reference to FIG. 8. In some embodiments, adder circuit 910 can be powered down when not in use. For example, when $M_{sum}$ is chosen from the bypass path rather than the adder path, adder circuit 910 can be shut down to save power. In the embodiment of FIG. 9, adder circuit 910 can be powered down by asserting the PWRDN signal on node 950.

Multiplexor 912, like adder circuit 910, receives exponents on nodes 920 and 922. Unlike adder circuit 910, however, multiplexor 912 selects one of the inputs rather than adding them. Multiplexor 912 selects the mantissa that corresponds to the larger floating point number. For example, when $E_{fb}$ is greater than $E_{cp}$, multiplexor 912 selects $E_{fb}$. Also for example, when $E_{cp}$ is greater than $E_{fb}$, multiplexor 912 selects $E_{cp}$. Multiplexor 912 drives node 913 with the selected exponent.

Multiplexor 914 selects the mantissa of the sum, $M_{sum}$, from the adder path when the input exponents are equal or differ by one, and selects $M_{sum}$ from the bypass path when the input exponents differ by more than one. When the input exponents differ by more than one, a shift of sixty-four or more would be needed to align the mantissas for addition, and the mantissas in the embodiment of FIG. 9 are fifty-seven bits long. The output of mantissa path 324 is a fifty-seven bit number in carry-save format.

Figure 10:
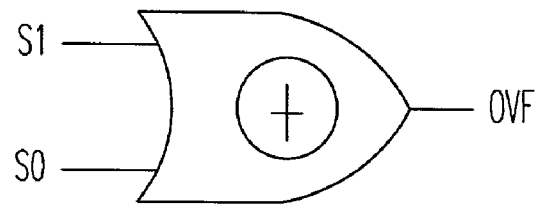
FIG. 10 shows an overflow detection circuit.

FIG. 10 shows an overflow detection circuit. Overflow detection circuit 1000 includes an exclusive-or gate to generate the OVF overflow signal when the output of the adder has overflowed. Overflow detection circuit 1000 resides in adder circuit 910 (FIG. 9), and generates the OVF signal that is sent to exponent path 322 (FIG. 8). Overflow detection circuit 1000 receives the most significant two bits of the sum in the carry-save format, and produces the overflow signal as the exclusive-or of these two bits. The six bit carry-save numbers from the previous negation example are now applied as examples in the context of overflow detection circuit 1000. Below these two examples, a more complex example is given.

A positive six is shown below as a carry-save number having sum and carry components. Each number includes two sign bits broken out from the rest of the number for clarity. The leftmost sign bit of the sum is S1, and the adjacent bit to the right is S0. Likewise, the leftmost sign bit of the carry is C1, and the adjacent bit to the right is C0. In this example, S1 and S0 are both zero, and there is no overflow.

| 00 0010 | <- sum |
| 00 0100 | <- carry |

A negative six is shown below as a carry-save number having sum and carry components. As in the previous example, the two sign bits of the sum and carry are broken out from the rest of the number for clarity. In this example, S1 and S0 are both zero, and there is no overflow. It should be noted that C1 and C0 are both one, but that C1 and C0 are not used as inputs to overflow detection circuit 1000, and so are irrelevant to the overflow determination.

| 00 0100 | <- sum |
| 11 1011 | <- carry |

In the previous two examples, no overflow existed. Another example is now provided that represents an overflow condition. Suppose that two numbers, "A" and "B," represented in carry-save format, are summed by adder circuit 910. "A" is equal to twenty two, and "B" is equal to sixteen. The two numbers are shown below as four bit carry-save numbers, each having two sign bits separated to the left.

| 00 1010 | <- sum of A |
| 00 1100 | <- carry of A |
| 00 1000 | <- sum of B |
| 00 1000 | <- carry of B |

The resultant of "A" plus "B" is represented as:

| 01 1110 | <- resultant sum of A plus B |
| 00 1000 | <- resultant carry of A plus B |

The maximum number that can be represented by a four bit carry-save number is thirty one. The resultant of A plus B in this example is equal to thirty eight, so overflow exists. Overflow detection circuit 1000 correctly detects the overflow condition because S1 and S0 are different.

Post-Normalization

Figure 11:
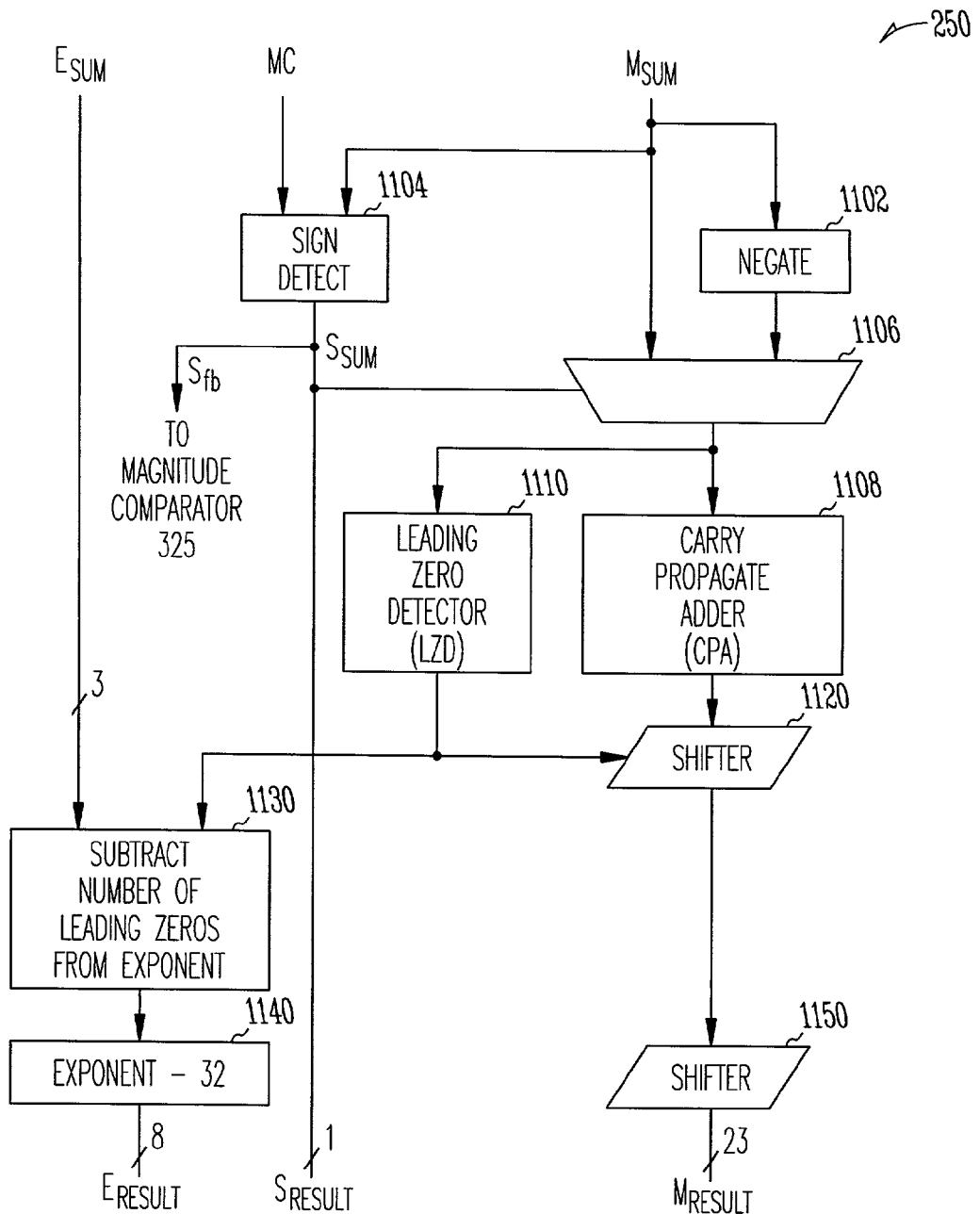
FIG. 11 shows a post-normalization circuit.

FIG. 11 shows a post-normalization circuit. Post-normalization circuit 250 includes sign detection circuit 1104, negation circuit 1102, multiplexor 1106, leading zero detector (LZD) 1110, carry propagate adder (CPA) 1108, shifters 1120 and 1150, and subtractors 1130 and 1140. Post-normalization circuit 250 receives the mantissa of the sum, $M_{sum}$, and the exponent of the sum, $E_{sum}$, generates the sign of the result, $S_{result}$, and converts the carry-save number into IEEE standard single precision format.

In some embodiments, one or more circuits within post-normalization circuit 250 is responsive to the enable signal on node 254 (FIG. 2). Each circuit is put into a low power state or completely powered down as a function of the state of the enable signal. Because some portions of post-normalization circuit 250 are outside the feedback loop, those portions only need to be turned on after the accumulation is complete. For example, when computing $\Sigma(a_i b_i)$ over 256 different values of i, much of post-normalization circuit 250 can be turned off for the first 255 accumulations, and only turned on for the $256^{th}$ accumulation, thereby saving power. The invention is not limited by the mechanism used to limit the power usage as a function of the enable signal. Example mechanisms include: controlling the reset of sequential circuits; and controlling series transistors of the type commonly used to limit leakage currents. One skilled in the art will recognize that many possible mechanisms exist for limiting power consumption as a function of the enable signal.

$M_{sum}$ is received by sign detection circuit 1104, negation circuit 1102, and multiplexor 1106. Sign detection circuit 1104 receives $M_{sum}$ and the magnitude compare (MC) signal produced by magnitude comparator 325 (FIG. 3), and produces $S_{sum}$, the sign of the sum. $S_{sum}$ is fedback to magnitude comparator 325 as $S_{fb}$. The operation of sign detection circuit 1104 and magnitude comparator 325 is described in more detail below with reference to FIG. 12. Multiplexor 1106 selects between $M_{sum}$ and a negated version thereof based on the sign of the sum, $S_{sum}$. This assures that the resulting mantissa is unsigned. Negation circuit 1102 can be a negation circuit such as that shown in FIG. 7.

CPA 1108 receives the mantissa in carry-save format and converts it to a binary number. Carry propagate adders are well known in the art. For an example of a carry propagate adder, see the Goto reference cited above with reference to FIG. 4. LZD 1110 detects the number of leading zeros in the mantissa, and provides that information to subtractor 1130 and shifter 1120. For a discussion of leading zero detectors, see Kyung T. Lee and Kevin J. Nowka, "1 GHz Leading Zero Anticipator Using Independent Sign-Bit Determination Logic," 2000 IEEE Symposium on VLSI Circuits Digest of Technical Papers, pgs 194–195. Subtractor 1130 subtracts the number of leading zeros from the exponent, and shifter 1120 shifts the mantissa left to remove the leading zeros. The exponent and mantissa are then converted to IEEE single precision format by subtractor 1140 and shifter 1150.

Figure 12:
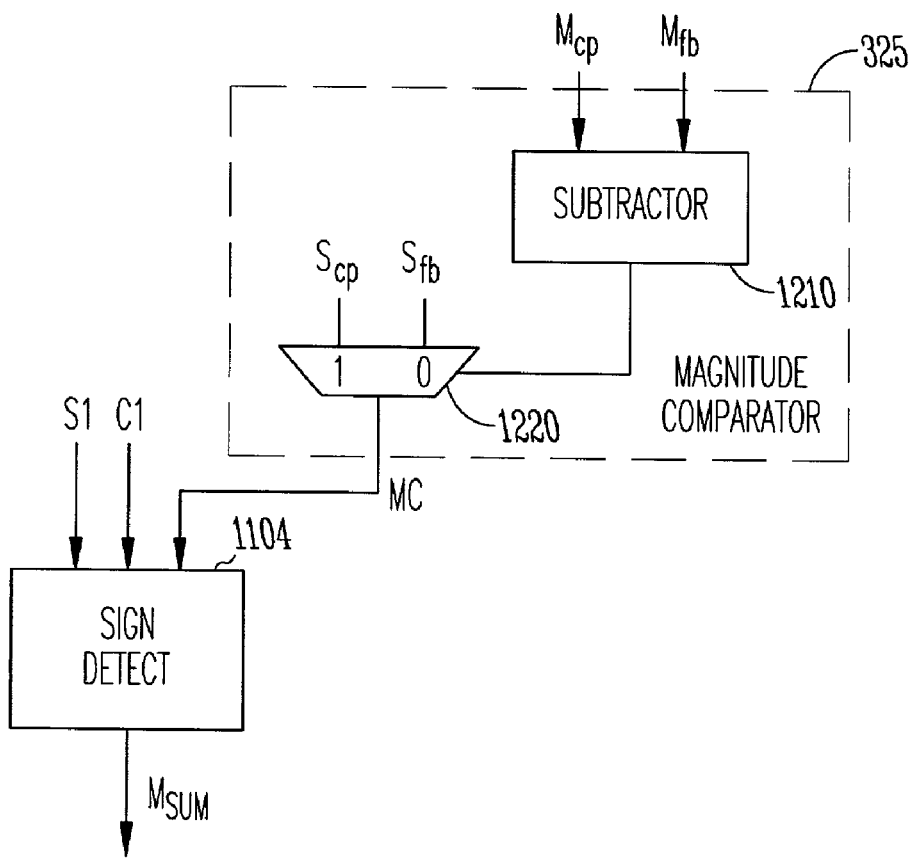
FIG. 12 shows a sign detection circuit.

FIG. 12 shows a sign detection circuit and a magnitude comparator. Magnitude comparator 325 is the same magnitude comparator shown in FIG. 3. It is shown in more detail here to illustrate the combined operation of magnitude comparator 325 and sign detection circuit 1104. Magnitude comparator 325 includes subtractor 1210 and multiplexer 1220. Subtractor 1210 controls multiplexer 1220 such that MC is equal to the sign of the larger $M_{cp}$ and $M_{fb}$. For example, when $M_{cp}$ is larger than $M_{fb}$, MC is equal to $S_{cp}$. Likewise, when $M_{fb}$ is larger than $M_{cp}$, MC is equal to $S_{fb}$. Sign detection circuit 1104 receives MC and also receives the most significant bits of the sum and carry of $M_{sum}$, labeled S1 and C1, respectively. Sign detection circuit 1104 includes logic that generates a sign bit in accordance with the following truth table, where "X" signifies either a 1 or a 0, and "–" indicates an impossible case.

| S1 | C1 | MC | Sign |
|----|----|----|------|
| 0  | 0  | X  | 0    |
| 0  | 1  | X  | 1    |
| 1  | 0  | 0  | 0    |
| 1  | 0  | 1  | 1    |
| 1  | 1  | X  | —    |

Magnitude comparator 325 operates in parallel with adder mantissa path 324, so MC is available for sign detection circuit 1104 at substantially the same time as Msum. In this manner, the operation of sign detection circuit 1104 does not appreciably increase the delay within the feedback loop.

CONCLUSION

The method and apparatus of the present invention provide a fast multiply-accumulate operation that can be made compliant with any floating point format. Furthermore, the method and apparatus of the present invention can provide precision comparable to the precision available using prior art double precision arithmetic units, in part because the mantissa fields are expanded. In some embodiments, IEEE standard single precision operands are multiplied and the products are summed. The multiplier includes a compressor tree to generate a product with a binary exponent and a mantissa in carry-save format. The product is converted into a number having a three bit exponent and a fifty-seven bit mantissa in carry-save format for accumulation. An adder circuit accumulates the converted products in carry-save format. Because the products being summed are in carry-save format, post-normalization is avoided within the adder feedback loop. In addition, because the adder operates on floating point number representations having exponents with a least significant bit weight of thirty-two, exponent comparisons within the adder exponent path are fast, and variable shifters can be avoided in the adder mantissa path. When the adder is not pipelined, a fast single cycle accumulation is realized with the method and apparatus of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An integrated circuit comprising:
   a multiplier to produce a product from two floating point multiplicands having a first exponent weight;
   a floating point conversion unit to convert the product from the first exponent weight to a converted product with a second exponent weight;
   an adder to produce a present sum from the converted product and a previous sum having the second exponent weight;
   a post-normalization unit to convert the present sum to a floating point resultant having the first exponent weight;
   wherein the multiplier is configured to produce a product with an exponent weight of one; and
   wherein the floating point conversion unit is configured to convert the product from an exponent weight of one to an exponent weight of thirty-two.

2. The integrated circuit of claim 1 wherein the adder is configured to receive a converted product having an exponent with a least significant bit weight of thirty-two and a mantissa in carry-save format.

3. An integrated circuit comprising:
   a multiplier to produce a product from two floating point multiplicands having a first exponent weight;
   a floating point conversion unit to convert the product from the first exponent weight to a converted product with a second exponent weight;
   an adder to produce a present sum from the converted product and a previous sum having the second exponent weight;
   a post-normalization unit to convert the present sum to a floating point resultant having the first exponent weight; wherein:
   the product comprises an exponent having a least significant bit weight of one and a mantissa in carry-save format; and
   the adder is configured to receive a converted product having an exponent with a least significant bit weight of thirty-two and a mantissa in carry-save format.

4. The integrated circuit of claim 3 wherein the floating point conversion unit is configured to shift a mantissa of the product by a number of bit positions equal to a value of the least significant five bits of the exponent of the product.

5. An integrated circuit comprising:
   a multiplier to produce a product from two floating point multiplicands having a first exponent weight;
   a floating point conversion unit to convert the product from the first exponent weight to a converted product with a second exponent weight;
   an adder to produce a present sum from the converted product and a previous sum having the second exponent weight;
   a post-normalization unit to convert the present sum to a floating point resultant having the first exponent weight;
   wherein the converted product comprises a three bit exponent field having a least significant bit weight of thirty-two.

6. The integrated circuit of claim 5 wherein the converted product further comprises a fifty-seven bit mantissa field in carry-save format.

7. A floating point multiply-accumulate circuit comprising:
   an exponent path including:
      an exponent summer to sum two input exponents having a first weight to produce a product exponent;
      an exponent conversion unit coupled to the output of the exponent summer, to convert the product exponent to a second weight; and
      an exponent accumulation stage to choose a larger exponent from the product exponent and an accumulated exponent; and
   a mantissa path including:
      a mantissa multiplier to multiply two input mantissas and produce a product mantissa;
      a mantissa shifter to shift the product mantissa responsive to the exponent conversion unit in the exponent path; and
      a mantissa accumulator to accumulate shifted product mantissas;
   wherein the mantissa shifter is configured to shift the product mantissa by a number of bit positions equal to a value of the least significant N bits of the product exponent, where N is a predetermined integer.

8. The floating point multiply-accumulate circuit of claim 7 wherein the mantissa accumulator comprises four-to-two compressors.

9. The floating point multiply-accumulate circuit of claim 7 further comprising a post-normalization stage to produce a normalized floating point resultant.

10. The floating point multiply-accumulate circuit of claim 9 wherein the post-normalization stage is configured to be turned off until accumulation is complete.

11. The floating point multiply-accumulate circuit of claim 7 wherein the product mantissa is in carry-save format.

12. The floating point multiply-accumulate circuit of claim 11 wherein the mantissa accumulator is configured to accumulate numbers in carry-save format.

13. A floating point multiply-accumulate circuit comprising:
an exponent path including:
an exponent summer to sum two input exponents having a first weight to produce a product exponent;
an exponent conversion unit coupled to the output of the exponent summer, to convert the product exponent to a second weight; and
an exponent accumulation stage to choose a larger exponent from the product exponent and an accumulated exponent; and
a mantissa path including:
a mantissa multiplier to multiply two input mantissas and produce a product mantissa;
a mantissa shifter to shift the product mantissa responsive to the exponent conversion unit in the exponent path; and
a mantissa accumulator to accumulate shifted product mantissas;
wherein the mantissa shifter is configured to shift the product mantissa by a number of bit positions equal to a value of the least significant five bits of the product exponent.

14. The floating point multiply-accumulate circuit of claim 13 wherein the exponent conversion unit is configured to zero the least significant five bits of the product exponent.

15. A floating point multiply-accumulate circuit comprising:
an exponent path including:
an exponent summer to sum two input exponents having a first weight to produce a product exponent;
an exponent conversion unit coupled to the output of the exponent summer, to convert the product exponent to a second weight; and
an exponent accumulation stage to choose a larger exponent from the product exponent and an accumulated exponent; and
a mantissa path including:
a mantissa multiplier to multiply two input mantissas and produce a product mantissa;
a mantissa shifter to shift the product mantissa responsive to the exponent conversion unit in the exponent path; and
a mantissa accumulator to accumulate shifted product mantissas;
wherein the exponent conversion unit is configured to convert the product exponent to have a least significant bit weight equal to thirty-two.

16. The floating point multiply-accumulate circuit of claim 15 further comprising a post-normalization stage to produce a normalized floating point resultant.

17. A method of performing a multiply-accumulate operation comprising:
multiplying two floating point mantissas and summing two floating point exponents to form a product;
converting the product to have a different least significant bit weight exponent field;
accumulating the converted product; and
post-normalizing the accumulated product;
wherein converting comprises:
shifting a mantissa of the product by an amount equal to the value of the least significant N bits of the exponent of the product, where N is a predetermined integer; and
zeroing the least significant N bits of an exponent of the product.

18. The method of claim 17 wherein accumulating the product comprises accumulating the product in carry-save format.

19. The method of claim 17 wherein accumulating the product comprises adding a first plurality of products with a last product, the method further comprising turning off post-normalization until the last product is accumulated.

20. A method of performing a multiply-accumulate operation comprising:
multiplying two floating point mantissas and summing two floating point exponents to form a product;
converting the product to have a different least significant bit weight exponent field;
accumulating the converted product; and
post-normalizing the accumulated product;
wherein converting comprises:
shifting a mantissa of the product by an amount equal to the value of the least significant five bits of the exponent of the product; and
zeroing the least significant five bits of an exponent of the product.

21. The method of claim 20 wherein accumulating the product comprises adding a first plurality of products with a last product, the method further comprising turning off post-normalization until the last product is accumulated.

22. A method of performing a multiply-accumulate operation comprising:
multiplying two floating point mantissas and summing two floating point exponents to form a product;
converting the product to have a different least significant bit weight exponent field;
accumulating the converted product; and
post-normalizing the accumulated product;
wherein accumulating comprises:
comparing an exponent of a first converted product to an exponent of a second converted product;
conditionally shifting right by a fixed amount the mantissa of the converted product having a smaller exponent;
selecting the larger exponent as a resultant exponent; and
producing a resultant mantissa from a mantissa of the first converted product and a mantissa of the second converted product.

23. The method of claim 22 wherein conditionally shifting right comprises selecting one of two inputs of a multiplexor.

24. The method of claim 22 wherein producing a resultant mantissa comprises selecting the mantissa of the first converted product if the exponent of the first converted product is more than one greater than the exponent of the second converted product.

25. The method of claim 22 wherein producing a resultant mantissa comprises adding mantissas of the first and second converted products to produce a resultant mantissa.

26. The method of claim 22 wherein conditionally shifting right comprises:
when the exponent of the first converted product is one greater than the exponent of the second converted product, shifting a mantissa of the second converted product thirty-two bit positions to the right.

* * * * *